(12) United States Patent
Liu

(10) Patent No.: US 12,443,475 B2
(45) Date of Patent: Oct. 14, 2025

(54) METHOD AND APPARATUS FOR OBTAINING INFORMATION OF STACK FRAME IN CALL STACK, DEVICE, AND MEDIUM

(71) Applicant: Beijing Bytedance Network Technology Co., Ltd., Beijing (CN)

(72) Inventor: Hongkai Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 69 days.

(21) Appl. No.: 18/277,005

(22) PCT Filed: Feb. 28, 2022

(86) PCT No.: PCT/CN2022/078365
§ 371 (c)(1),
(2) Date: Aug. 11, 2023

(87) PCT Pub. No.: WO2022/199331
PCT Pub. Date: Sep. 29, 2022

(65) Prior Publication Data
US 2024/0126627 A1  Apr. 18, 2024

(30) Foreign Application Priority Data
Mar. 22, 2021 (CN) .......................... 202110303887.1

(51) Int. Cl.
*G06F 11/07* (2006.01)
*G06F 11/00* (2006.01)

(52) U.S. Cl.
CPC ........ *G06F 11/006* (2013.01); *G06F 11/0766* (2013.01); *G06F 11/0787* (2013.01); *G06F 2201/87* (2013.01)

(58) Field of Classification Search
CPC ............. G06F 11/3636; G06F 11/0766; G06F 11/0787
See application file for complete search history.

(56) References Cited

U.S. PATENT DOCUMENTS

| 8,392,695 B1 * | 3/2013 | Lachwani | G06F 11/0787 |
| | | | 714/24 |
| 10,725,846 B1 * | 7/2020 | Schreter | G06F 11/3612 |

(Continued)

FOREIGN PATENT DOCUMENTS

| CN | 103019707 A | 4/2013 |
| CN | 103106132 A | 5/2013 |

(Continued)

OTHER PUBLICATIONS

Huang et al., "LMP-Light-Weighted Memory Protection with Hardware Assistance," ACSAC '16: 2016 Annual Computer Security Applications Conference, Dec. 9, 2016, pp. 1-11.

(Continued)

*Primary Examiner* — Yolanda L Wilson
(74) *Attorney, Agent, or Firm* — Astute IP Law Group

(57) ABSTRACT

Provided are a method and apparatus for obtaining information of a stack frame in a call stack, a device, and a medium. The method includes: obtaining to-be-processed call stack with an abnormality during running of a program, each area element of the to-be-processed call stack including a method pointer and corresponding instruction offset value; applying for a first memory area used to store the method pointer and the corresponding instruction offset value; applying for a second memory area, and storing an address of the first memory area into a first area element in the second memory area; applying for a third memory area, and storing an address of the second memory area into a target storage area in the third memory area; and obtaining infor- (Continued)

mation of each stack frame in the to-be-processed call stack based on the address of the second memory area stored in the target storage area.

20 Claims, 4 Drawing Sheets

(56) References Cited

U.S. PATENT DOCUMENTS

| | | | |
|---|---|---|---|
| 2020/0371945 A1 | 11/2020 | Peles et al. | |
| 2021/0081208 A1 | 3/2021 | Liu et al. | |
| 2023/0289253 A1* | 9/2023 | Keshwani | G06F 11/073 |

FOREIGN PATENT DOCUMENTS

| | | | |
|---|---|---|---|
| CN | 110764941 A | 2/2020 | |
| CN | 111813465 A | 10/2020 | |
| CN | 112084024 A | 12/2020 | |
| CN | 112905381 A | 6/2021 | |

OTHER PUBLICATIONS

International Search Report in PCT/CN2022/078365, mailed May 9, 2022, 4 pages.
Liang et al., "S-Tracker: Shellcode Detection Method Based on Stack Irregularity," Journal of Huazhong University of Science and Technology, Nov. 30, 2014, vol. 42, No. 11, pp. 1-8.
Notification to Grant Patent Right for Invention and Search Report in CN202110303887.1, mailed Nov. 1, 2022, 3 pages.

* cited by examiner

METHOD AND APPARATUS FOR OBTAINING INFORMATION OF STACK FRAME IN CALL STACK, DEVICE, AND MEDIUM

CROSS-REFERENCE TO RELATED APPLICATION

This is a national stage application filed under 37 U.S.C. 371 of International Patent Application No. PCT/CN2022/078365, filed Feb. 28, 2022, which claims priority to Chinese Patent Application No. 202110303887.1, titled "METHOD AND APPARATUS FOR OBTAINING INFORMATION OF STACK FRAME IN CALL STACK, DEVICE, AND MEDIUM", and filed on Mar. 22, 2021, the disclosures of which are incorporated herein by reference in their entireties.

FIELD

The present disclosure relates to the field of computer technologies, and more particularly, to a method and apparatus for obtaining information of a stack frame in a call stack, a device, and a medium.

BACKGROUND

During running of an application program, a method pointer (e.g., a pointer of ArtMethod) and an instruction offset value (DexPc) included in each stack frame can be obtained by means of a stack backtrace, but detailed information describing a current method, such as a method name and a source code line number, cannot be directly obtained.

In order to obtain detailed information describing the method, in the existing solution, on one hand, a method (e.g., ArtMethod) pointer may be used as a parameter to invoke a PrettyMethod function to obtain character string description information of the corresponding method; on the other hand, dex_file information corresponding to the method may be obtained by means of some underlying technologies, and then information such as a class name and a method name where the method is located is obtained based on the dex_file information.

However, in the first method described above, only the name information of the method can be obtained, and the corresponding line number information cannot be obtained, therefore the source code cannot be quickly located. In the second method described above, since a variety of underlying technologies is required, it is complex to implement and difficult to guarantee stability, uncertain factors are present for different system versions in terms of compatibility, and therefore large adaptation workload may be involved.

SUMMARY

In order to solve the above technical problems or at least partially solve the above technical problems, the present disclosure provides a method and apparatus for obtaining information of a stack frame in a call stack, a device, and a medium.

In a first aspect, embodiments of the present disclosure provide a method for obtaining information of a stack frame in a call stack. The method includes: obtaining a to-be-processed call stack with an abnormality during running of a program, each area element of the to-be-processed call stack comprising a method pointer and an instruction offset value corresponding to the method pointer, where a total number of area elements of the to-be-processed call stack is N; applying for a first memory area, a first half of area elements of the first memory area being used to store the method pointer, and a second half of the area elements of the first memory area being used to store the instruction offset value corresponding to the method pointer, wherein a total number of the area elements of the first memory area is 2N; applying for a second memory area, and storing the address of the first memory area into a first area element in the second memory area, wherein a total number of area elements of the second memory area is N+1; obtaining an address of the second memory area; applying for a third memory area, obtaining a target storage area in the third memory area, and storing the address of the second memory area into the target storage area; and obtaining information of each stack frame in the to-be-processed call stack by executing a code segment corresponding to a stack frame information obtaining functional module getStackTrace based on the address of the second memory area stored in the target storage area.

In a second aspect, the embodiments of the present disclosure further provide an apparatus for obtaining information of a stack frame in a call stack. The apparatus includes: a call stack obtaining module configured to obtain a to-be-processed call stack with an abnormality during running of a program, each area element of the to-be-processed call stack comprising a method pointer and an instruction offset value corresponding to the method pointer, wherein a total number of area elements of the to-be-processed call stack is N; a first memory applying module configured to apply for a first memory area, a first half of area elements of the first memory area being used to store the method pointer, and a second half of the area elements of the first memory area being used to store the instruction offset value corresponding to the method pointer, wherein a total number of the area elements of the first memory area is 2N; a first address obtaining module configured to obtain an address of the first memory area; a second memory applying module configured to apply for a second memory area, and store the address of the first memory area into a first area element in the second memory area, wherein a total number of area elements of the second memory area is N+1; a second address obtaining module configured to obtain an address of the second memory area; a third memory applying module configured to apply for a third memory area, obtain a target storage area in the third memory area, and store the address of the second memory area into the target storage area; and a stack frame information obtaining module configured to obtain information of each stack frame in the to-be-processed call stack by executing a code segment corresponding to a stack frame information obtaining functional module getStackTrace based on the address of the second memory area stored in the target storage area.

In a third aspect, the embodiments of the present disclosure further provide an electronic device. The device includes: a memory having a computer program stored therein; and a processor. The computer program, when executed by the processor, causes the electronic device to implement any method for obtaining the information of the stack frame in the call stack according to the embodiments of the present disclosure.

In a fourth aspect, the embodiments of the present disclosure further provide a computer-readable storage medium. The computer-readable storage medium has a computer program stored therein. The computer program, when executed by a computing device, causes the computing device to implement any method for obtaining the information of the stack frame in the call stack according to the embodiments of the present disclosure.

The technical solutions provided by the embodiments of the present disclosure at least have the following advantages compared with the related art.

In the embodiments of the present disclosure, by applying for the first memory area, storing the method pointer in the to-be-processed call stack with an abnormity during running of the program into the first half of area elements of the first memory area, storing the instruction offset value corresponding to the method pointer into the second half of the area elements of the first memory area, then storing the address of the first memory area into the first area element in the applied second memory area, and then storing the address of the second memory area into the target storage area in the applied third memory area, the method pointer and the instruction offset value corresponding to the method pointer are therefore stored in a controllable way; and ultimately, the information of each stack frame in the to-be-processed call stack is obtained by executing the code segment corresponding to the stack frame information obtaining functional module getStackTrace based on the address of the second memory area stored in the target storage area. Therefore, the problem in the related art that the detailed information of the stack frame cannot be stably obtained is solved, the detailed information of the stack frame is obtained stably, the complexity of obtaining the detailed information of the stack frame is reduced, and the compatibility is high for different system versions. By obtaining the detailed information of the stack frame, it facilitates to easily locate the abnormality during the running of the program subsequently, and improves the efficiency of solving the abnormality of the program.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

In order to clearly illustrate technical solutions of embodiments of the present disclosure or the related art, a brief description of accompanying drawings used in embodiments or the related art is given below. Apparently, for those skilled in the art, other accompanying drawings can be obtained according to these accompanying drawings without creative labor.

DETAILED DESCRIPTION

In order to clearly understand the above objects, features, and advantages of the present disclosure, the solutions of the present disclosure are further described below. It is noted that the embodiments of the present disclosure and the features in the embodiments may be combined with each other without conflict.

While many specific details are illustrated in the following description to facilitate a full understanding of the present disclosure, the present disclosure may also be implemented in other ways than those described herein. Apparently, the embodiments in the specification are merely some embodiments of the present disclosure and not all embodiments of the present disclosure.

Figure 1:
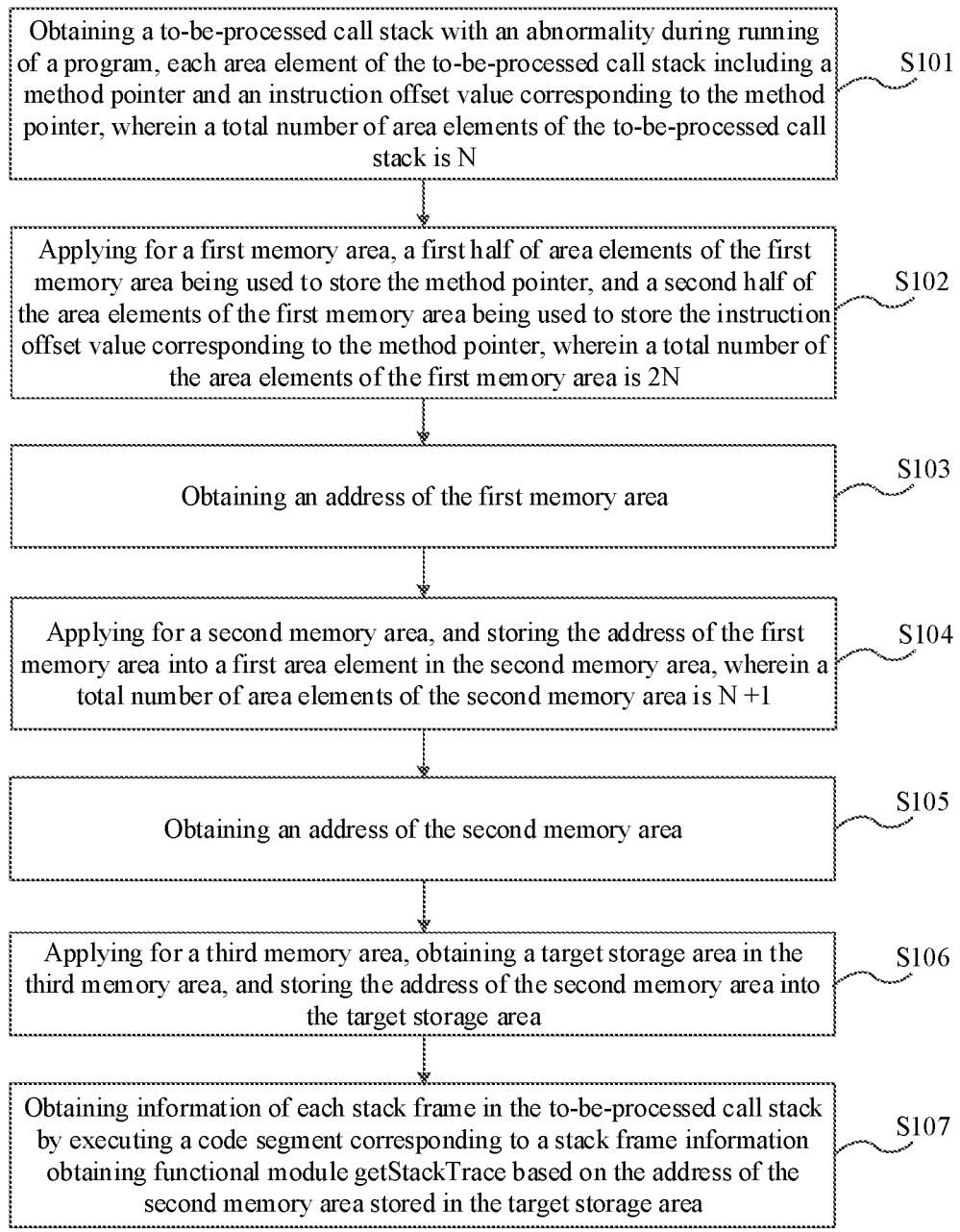
FIG. 1 illustrates a flowchart of a method for obtaining information of a stack frame in a call stack according to an embodiment of the present disclosure.

FIG. 1 illustrates a flowchart of a method for obtaining information of a stack frame in a call stack according to an embodiment of the present disclosure. The method can be executed by the apparatus for obtaining the information of the stack frame in the call stack. The apparatus can be implemented in software and/or hardware and can be integrated in an electronic device with computing capabilities, such as a mobile terminal, a laptop, a computer, etc.

As illustrated in FIG. 1, according to the embodiment of the present disclosure, the method for obtaining information of the stack frame in the call stack includes operations at the following blocks.

At block S101, to-be-processed call stack with an abnormality is obtained during running of a program. Each area element of the to-be-processed call stack includes a method pointer and an instruction offset value corresponding to the method pointer. A total number of area elements of the to-be-processed call stack is N.

The running of the program mentioned in the embodiment of the present disclosure may be running of at least one application on the electronic device. The call stack with the abnormality during the running of the program, for example, a call stack generated during a program crash, a program lag, etc., can be obtained by an available method for obtaining the call stack in the related art, and is taken as an object to be processed subsequently.

In one embodiment, the call stack can be represented in a form of an array at an underlying code level. An element position in the array corresponds to an area element of the call stack. The total number N of the area elements of the call stack is a length N of the array, and N is an integer. Each element of the array is consisted of a method pointer ArtMethod (or called ArtMethod pointer) and an instruction offset value DexPc, and the method pointer and the instruction offset value are in a one-to-one correspondence.

Optionally, the operation of obtaining the call stack with the abnormality during the running of the program includes: obtaining a plurality of call stacks each with an abnormality during the running of the program; determining duplicated call stacks from the plurality of call stacks through comparison of the method pointer and the instruction offset value between the plurality of call stacks, the duplicated call stacks being call stacks having the same method pointer and the same instruction offset value; and performing de-duplication on the plurality of call stacks based on the duplicated call stacks, to obtain the to-be-processed call stack.

By performing the de-duplication on the plurality of call stacks obtained, the number of to-be-processed call stacks can be reduced and the efficiency of obtaining the information of the stack frame can be improved without affecting accuracy of obtaining the information of the stack frame.

At block S102, a first memory area is applied for. A first half of area elements of the first memory area are used to store the method pointer, and a second half of the area elements of the first memory area is used to store the instruction offset value corresponding to the method pointer. A total number of the area elements of the first memory area is 2N.

Secondary storage of the method pointer and the instruction offset value in each to-be-processed call stack is achieved by applying for the first memory area. In one embodiment, the method pointer may be used to obtain at least one of a method name of the stack frame, a class name where a method of the stack frame is located, or a source code file name corresponding to the stack frame; and the instruction offset value may be used to obtain a source code line number corresponding to the stack frame.

Exemplarily, the operation of applying for the first memory area includes: applying for the first memory area for a first array belonging to an integer type (an int type) or a long integer type (a long type). During construction of program codes, a code used to apply for the first memory area for the above mentioned first array is constructed. For example, a new int[ ] command or a new long[ ] command may be used to create the first array belonging to the integer type or the long integer type. Elements of the first array are stored in the area elements of the first memory area, respectively. For a 32-bit system, the first array is of the integer type; and for a 64-bit system, the first array is of the long integer type.

To ensure subsequent stable and accurate access to the information of the stack frame, the method pointer or the instruction offset value occurs in the to-be-processed call stack in a same sequence as in the first memory area, i.e., the method pointer or instruction offset value occurs in the to-be-processed call stack in a same sequence as in the first array.

At block S103, an address of the first memory area is obtained.

The address of the memory area may be obtained based on any available existing address obtaining method. The address of the first memory area may be used to obtain a storage content in the first memory area.

At block S104, a second memory area is applied for, and the address of the first memory area is stored into a first area element in the second memory area. A total number of area elements of the second memory area is N+1.

During execution of a code segment corresponding to a stack frame information obtaining functional module getStackTrace, only a storage content in the first area element in the second memory area is concerned, therefore the address of the first memory area is stored into the first area element in the second memory area. Storage contents in other remaining area elements in the second memory area are not specifically limited by the embodiments of the present disclosure, for example, a default value null may be reserved. Moreover, based on a nature of the stack frame information obtaining function getStackTrace, the total number of area elements in the second memory area needs to be N+1, in order to ensure a successful function call.

Exemplarily, the operation of applying for the second memory area includes applying for the second memory area for a second array under an object base class Object. During the construction of the program codes, a code used to apply for the second memory area for the second array under the object base class Object (i.e., for a java program, the second array is of an Object[ ] type) is constructed. For example, a new Object[ ] command may be used to create the second array under the object base class Object. Elements of the second array are stored into the area elements of the second memory area, respectively.

It should be noted that, in the embodiments of the present disclosure, an execution sequence between the operations at blocks is not strictly limited on the premise of ensuring a logically reasonable scheme. For example, for the operation at block S103 and the operation at block S104, the address of the first memory area may be obtained first and then the second memory area may be applied for, or the second memory area may be applied for first and then the address of the first memory area may be obtained. Of course, obtaining the address of the first memory area and applying for the second memory area may alternatively be performed simultaneously, which is not limited by the embodiments of the present disclosure.

At block S105, an address of the second memory area is obtained.

The address of the second memory area may be used to obtain a storage content in the second memory area.

At block S106, a third memory area is applied for, a target storage area in the third memory area is obtained, and the address of the second memory area is stored into the target storage area.

The target storage area in the third memory area may be determined based on an execution requirement of the stack frame information obtaining function getStackTrace. Exemplarily, the operation of applying for the third memory area includes: applying for the third memory area for a target object under an abnormal parent class Throwable. During the construction of the program codes, a code used to apply for the third memory area for the target object under the abnormal parent class Throwable is constructed. For example, a new Throwable( ) command may be used to create the target object under the abnormal parent class Throwable, and the target object may be exemplarily represented by thr. After applying for the third memory area is completed, the target storage area in the third memory area is obtained and the address of the second memory area is stored into the target storage area.

At block S107, information of each stack frame in the to-be-processed call stack is obtained by executing a code segment corresponding to a stack frame information obtaining functional module getStackTrace based on the address of the second memory area stored in the target storage area.

In one embodiment, during the execution of the getStackTrace function, the address of the first memory area stored in the first area element in the second memory area can be obtained based on the address of the second memory area, the method pointer and the instruction offset value corresponding to the method pointer that are stored into the first memory area can be obtained based on the address of the first memory area, then the at least one of the method name of the stack frame, the class name where the method of the stack frame is located, or the source code file name corresponding to the stack frame can be obtained based on the method pointer, and the source code line number corresponding to the stack frame can be obtained based on the instruction offset value corresponding to the method pointer. The information of the stack frame mentioned in the embodiments of the present disclosure includes at least one of a method name of the stack frame, a class name where a method of the stack frame is located, a source code file name corresponding to the stack frame, or a source code line number corresponding to the stack frame.

Exemplarily, during the construction of the target object under the abnormal parent class Throwable, an initial member (a backtrace member) of the target object is constructed simultaneously, and the target storage area is used to store the backtrace member. The getStackTrace function in the code segment corresponding to the stack frame information obtaining functional module getStackTrace belongs to a function of the target object under the abnormal parent class Throwable. By storing the address of the second memory area into the target storage area, i.e., replacing the initial member of the target object with the second array under the object base class Object, input to the getStackTrace function is effectively controlled to obtain the information of the stack frame as desired.

In an embodiment, the operation of obtaining the information of each stack frame in the to-be-processed call stack by executing the code segment corresponding to the stack frame information obtaining functional module getStackTrace based on the address of the second memory area stored in the target storage area includes: obtaining a storage address of the information of each stack frame in the to-be-processed call stack by executing the code segment corresponding to the stack frame information obtaining functional module getStackTrace based on the address of the second memory area stored in the target storage area; and obtaining the information of each stack frame based on the storage address.

The function getStackTrace belongs to a system function, a return value of which during an execution of the function is a storage address pointing to a specific array, and the information of the stack frame as desired can be obtained based on the storage address. Exemplarily, the storage address points to a stack frame information array StackTraceElement in which each element corresponds to information of a different stack frame.

For example, the operation of obtaining information of the different stack frame corresponding to each element in the array StackTraceElement can be implemented by the following program commands.

StackTraceElement[ ] elements=thr. getStackTrace ( ); //thr is used to refer to the target object under the abnormal parent class Throwable; and elements is used as an array name under the StackTraceElement[ ] type, which is used herein as an example only, and the array name can be determined flexibly elements[0].getMethodName ( ); //a method name of a current stack frame elements[0].getClassName ( ); //a class name where a method of the current stack frame is located elements[0].getFileName ( ); //a source code file name corresponding to the current stack frame elements[0].getLineNumber ( ); //a source code line number corresponding to the current stack frame The above program commands are provided as an example and should not be construed as a specific limitation of the embodiments of the present disclosure.

In order to facilitate understanding of the embodiments of the present disclosure, exemplary program codes are used as follows to illustrate the embodiments of the present disclosure from a perspective of programming, but should not be construed as a specific limitation of the embodiments of the present disclosure. In one embodiment, the total number N of area elements of the to-be-processed call stack equal to 2 is taken as an example for description, i.e., the to-be-processed call stack includes two sets of elements: a method pointer method1 and an instruction offset value dexpc1, and a method pointer method2 and an instruction offset dexpc2.

The exemplary program codes are as follows:

```
int method1, method2, dexpc1, dexpc2; // an original input of this scheme, i.e., the method pointers and instruction offset values in the to-be-processed call stack
    method1=973; // the following specific values of method1, method1, dexpc1, and dexpc2, are determined based on an actually obtained call stack, each value herein is only taken as an example
    method2=460;
    dexpc1=0;
    dexpc2=0;
    int[ ] firstIL =new int [4]; // a first array firstIL which belongs to the integer type and has a length of 4 is created (i.e. the number of elements is 4); firstIL is used as an array name as an example only, and the array name can be set flexibly based on the programming situation; herein the integer type array is created for a 32-bit system as an example; and for the 64-bit system, a long integer type array needs to be created.
    firstIL[0]= method1; // the first method pointer method1 in the call stack is determined as a first element of the array firstIL
    firstIL[1]=method2; // the second method pointer method2 in the call stack is determined as a second element of the array firstIL
    firstIL[2]= dexpc1; // the first instruction offset dexpc1 in the call stack is determined as a third element of the array firstIL
    firstIL[3]= dexpc2; // the second instruction offset dexpc2 in the call stack is determined as a fourth element of the array firstIL
    Object[ ] backtrace=new Object[3]; // a second array backtrace under the object base class Object is created, backtrace is used as an array name as an example only, and the array name can be set flexibly based on the programming situation; the second array backtrace has a length of 3, i.e., the number of elements is 3
    backtrace[0]= firstIL; // a pointer of the first array firstIL is determined as a first element of the second array backtrace, and other elements of the second array backtrace can take a default value null
    Throwable thr=new Throwable ( ); // the target object thr under the abnormal parent class Throwable is created, thr is used as an object name as an example only, and the object name can be set flexibly based on the programming situation
    try {
       Field backtraceFiled= Throwable.class.getDeclaredField (name: "backtrace"); backtraceFiled.set (thr, backtrace); // the initial member backtrace of the target object thr is replaced with the second array backtrace under the object base class Object
       StackTraceElement[ ] elements = thr. getStackTrace ( ); // the system function getStackTrace is invoked to obtain the information of each stack frame in the call stack
    } catch (Throwable e) {
       e.pintStackTrace ( ); // the information of each stack frame is outputted
    }
}
```

Further, according to the embodiments of the present disclosure, the method further includes: transmitting the information of each stack frame to a server. The server is configured to analyze the abnormality during the running of the program based on the information of each stack frame, thereby improving efficiency of solving the program abnormality. Exemplarily, the server can be in communication with a plurality of electronic devices configured to implement the technical solutions of the embodiments of the present disclosure, and based on the information of each stack frame in the call stack during running of a same application program, the abnormality during the running of the application program is accurately located through statistics and analysis of the information.

In the embodiments of the present disclosure, by applying for the first memory area, storing the method pointer in the to-be-processed call stack into the first half of area elements of the first memory area, storing the instruction offset value corresponding to the method pointer into the second half of the area elements of the first memory area, then storing the address of the first memory area into the first area element in the applied second memory area, and then storing the address of the second memory area into the target storage area in the applied third memory area, the method pointer and the instruction offset value corresponding to the method pointer are therefore stored in a controllable way; and ultimately, the information of each stack frame in the to-be-processed call stack is obtained by executing the code segment corresponding to the stack frame information obtaining functional module getStackTrace based on the address of the second memory area stored in the target storage area. Therefore, the problem in the related art that the detailed information of the stack frame cannot be stably obtained is solved, the detailed information of the stack frame is obtained stably, the complexity of obtaining the detailed information of the stack frame is reduced, and the compatibility is high for different system versions. By obtaining the detailed information of the stack frame, it facilitates to easily locate the abnormality during the running of the program subsequently, and improves the efficiency of solving the abnormality of the program.

Figure 2:
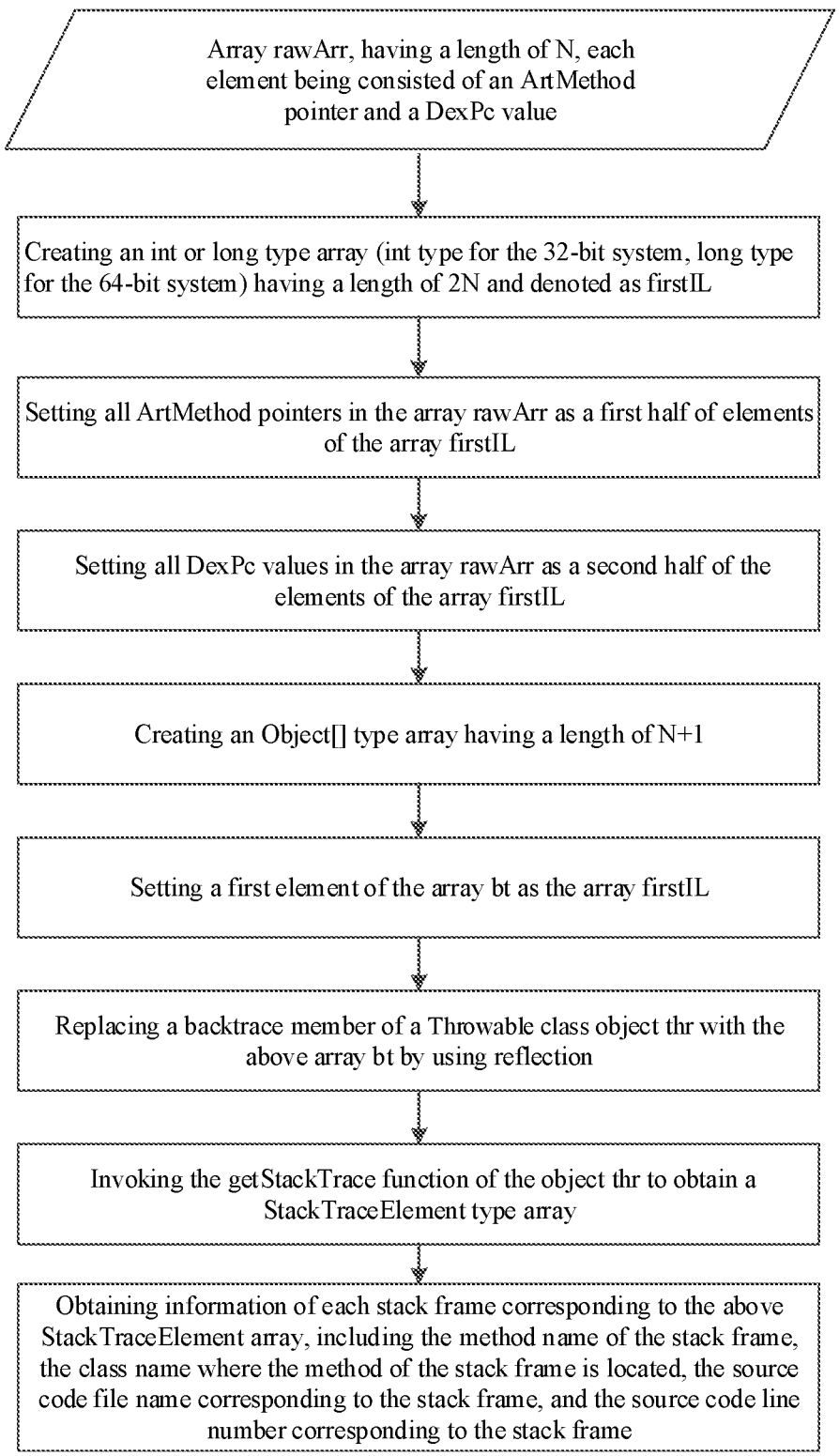
FIG. 2 illustrates a flowchart of another method for obtaining information of a stack frame in a call stack according to an embodiment of the present disclosure.

FIG. 2 illustrates a flowchart of another method for obtaining information of a stack frame in a call stack according to an embodiment of the present disclosure, which is used for exemplary illustration of the embodiments of the present disclosure, and should not be construed as a specific limitation of the embodiments of the present disclosure. In one embodiment, FIG. 2 exemplarily explains the embodiments of the present disclosure from a perspective of an execution flow of the computer program.

As illustrated in FIG. 2, during the running of the program, a bottom representation, e.g., an array, of the call stack with an abnormality may first be obtained during the running of the program. The array can be defined exemplarily to be represented by rawArr at a programming stage, each element of the array is consisted of one ArtMethod pointer and one corresponding instruction offset value DexPc, and the length of the array is denoted as N. An array of an int or long type (int type for the 32-bit system, long type for the 64-bit system) having a length of 2N is created. The array can be exemplarily defined to be represented by firstIL at the programming stage.

Then, all ArtMethod pointers in the array rawArr are set as elements of the first half of the array firstIL, and all DexPc values in the array rawArr are set as elements of the second half of the array firstIL. Since the length of the array firstIL is twice the length of the array rawArr, the ArtMethod pointers occupy a half of the array firstIL and the DexPc values occupy a half of the array firstIL. Moreover, the ArtMethod pointers or the DexPc values occur in the array firstIL in a same sequence as in the array rawArr.

Figure 3:
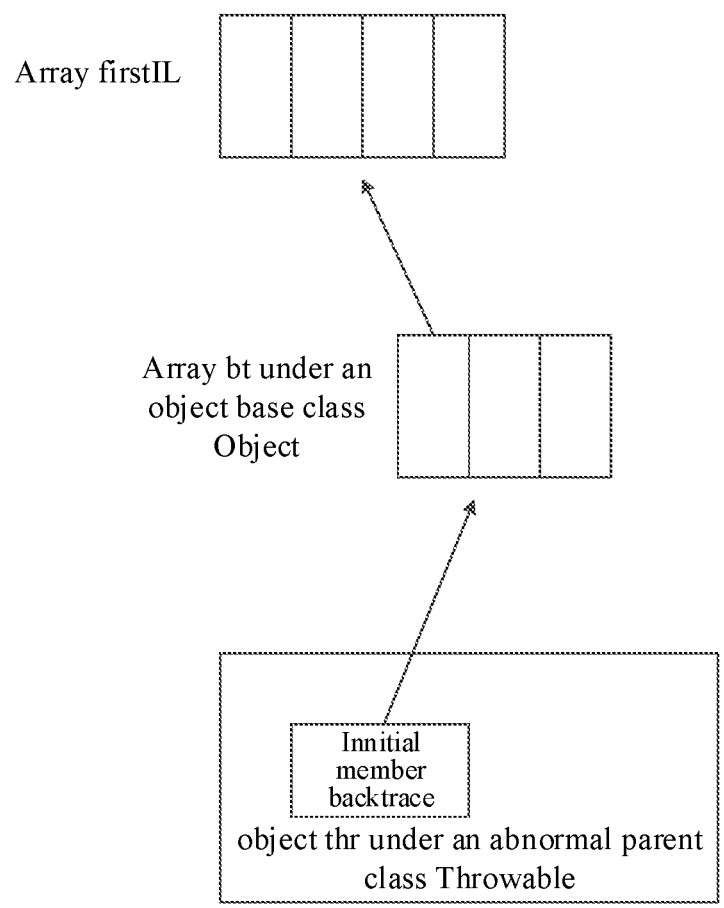
FIG. 3 illustrates a schematic diagram of a relation between arrays during a process of obtaining information of a stack frame according to an embodiment of the present disclosure.

An array of an Object[ ] (object base class) type is created. The array can be exemplarily defined to be represented by bt at the programming stage and has a length of N+1. Then a first element of the array bt is determined as the array firstIL, and the default value null is kept for remaining N elements of the array bt. FIG. 3, as an example, illustrates a schematic diagram of a relation between the arrays.

An object of the Throwable class (an abnormal parent class) is created. The object can be exemplarily defined to be represented by thr at the programming stage. The backtrace member of the object thr is replaced with the above array bt using reflection; and then the getStackTrace function of the object thr is invoked to obtain an array of the StackTraceElement type. Each element in the array of the StackTraceElement type corresponds to a stack frame and provides detailed information such as the method name of the stack frame, the class name where the method of the stack frame is located, the source code file name corresponding to the stack frame, and the source code line number corresponding to the stack frame.

According to the embodiments of the present disclosure, the detailed information of the stack frame is stably obtained, the complexity of obtaining the detailed information of the stack frame is reduced, and the compatibility is high for different system versions.

Figure 4:
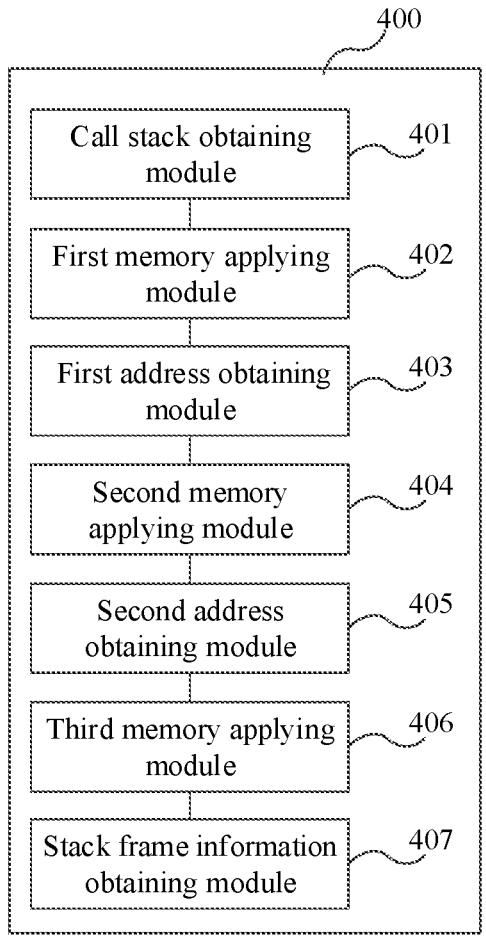
FIG. 4 illustrates a schematic structural diagram of an apparatus for obtaining information of a stack frame in a call stack according to an embodiment of the present disclosure.

FIG. 4 is a schematic structural diagram of an apparatus for obtaining information of a stack frame in a call stack according to an embodiment of the present disclosure, which may be implemented in software and/or hardware, and may be integrated in any electronic device with computing capabilities, such as a mobile terminal, a laptop, a computer, etc.

As illustrated in FIG. 4, according to an embodiment of the present disclosure, an apparatus 400 for obtaining information of a stack frame in a call stack is provided. The apparatus 400 may include a call stack obtaining module 401, a first memory applying module 402, a first address obtaining module 403, a second memory applying module 404, a second address obtaining module 405, a third memory applying module 406, and a stack frame information obtaining module 407.

The call stack obtaining module 401 is configured to obtain a to-be-processed call stack with an abnormality during running of a program. Each area element of the to-be-processed call stack includes a method pointer and an instruction offset value corresponding to the method pointer. A total number of area elements of the to-be-processed call stack is N.

The first memory applying module 402 is configured to apply for a first memory area. A first half of area elements of the first memory area is used to store the method pointer, and a second half of the area elements of the first memory area is used to store the instruction offset value corresponding to the method pointer. A total number of the area elements of the first memory area is 2N.

The first address obtaining module 403 is configured to obtain an address of the first memory area.

The second memory applying module 404 is configured to apply for a second memory area, and store the address of the first memory area into a first area element in the second memory area. A total number of area elements of the second memory area is N+1.

The second address obtaining module 405 is configured to obtain an address of the second memory area.

The third memory applying module 406 is configured to apply for a third memory area, obtain a target storage area in the third memory area, and store the address of the second memory area into the target storage area.

The stack frame information obtaining module 407 is configured to obtain information of each stack frame in the to-be-processed call stack by executing a code segment corresponding to a stack frame information obtaining functional module getStackTrace based on the address of the second memory area stored in the target storage area.

In an embodiment, the first memory applying module 402 is specifically configured to apply for the first memory area for a first array belonging to an integer type or a long integer type. Elements of the first array are stored into the area elements of the first memory area, respectively.

In an embodiment, the second memory applying module 404 is specifically configured to apply for the second memory area for a second array under an object base class Object. Elements of the second array are stored into the area elements of the second memory area, respectively.

In an embodiment, the third memory applying module 406 is specifically configured to apply for the third memory area for a target object under an abnormal parent class Throwable.

In an embodiment, the method pointer or the instruction offset value occurs in the to-be-processed call stack in a same sequence as in the first memory area.

In an embodiment, the stack frame information obtaining module 407 includes: a storage address return unit configured to obtain a storage address of the information of each stack frame in the to-be-processed call stack by executing the code segment corresponding to the stack frame information obtaining functional module getStackTrace based on the address of the second memory area stored in the target storage area; and a stack frame information obtaining unit configured to obtain the information of each stack frame based on the storage address.

In an embodiment, the storage address points to a stack frame information array. Each element of the stack frame information array corresponds to information of a different stack frame.

In an embodiment, the information of each stack frame includes at least one of a method name of the stack frame, a class name where a method of the stack frame is located, a source code file name corresponding to the stack frame, or a source code line number corresponding to the stack frame.

In an embodiment, according to the embodiments of the present disclosure, the apparatus 400 for obtaining the information of the stack frame in the call stack further includes: a stack frame information transmission module configured to transmit the information of each stack frame to a server. The server is configured to analyze the abnormality during the running of the program based on the information of each stack frame.

In an embodiment, the call stack obtaining module 401 includes: a call stack obtaining unit configured to obtain a plurality of call stacks each with an abnormality during the running of the program; a duplicated call stack determining unit configured to determine duplicated call stacks from the plurality of call stacks through comparison of the method pointer and the instruction offset value between the plurality of call stacks; and a call stack de-duplication unit configured to perform de-duplication on the plurality of call stacks based on the duplicated call stacks, to obtain the to-be-processed call stack.

According to the embodiments of the present disclosure, the apparatus for obtaining the information of the stack frame in the call stack can perform any of the methods for obtaining the information of the stack frame in the call stack according to the embodiments of the present disclosure, and has the functional modules for performing the method and beneficial effects. For what is not described in detail in the apparatus embodiments of the present disclosure, reference can be made to those described in any method embodiment of the present disclosure.

Figure 5:
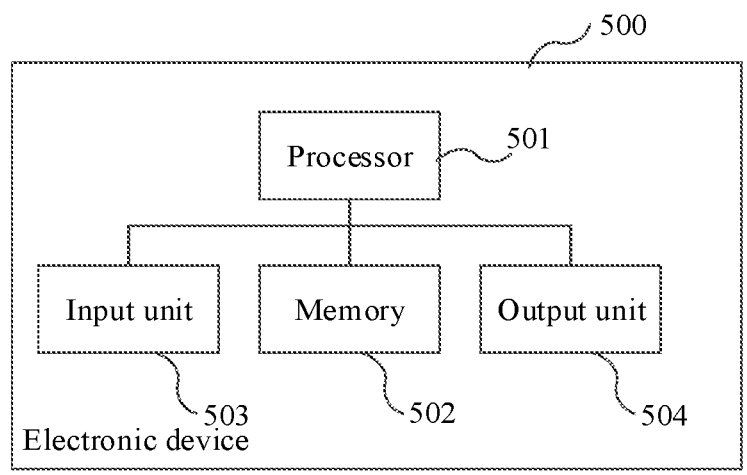
FIG. 5 illustrates a schematic structural diagram of an electronic device according to an embodiment of the present disclosure.

FIG. 5 is a schematic structural diagram of an electronic device according to an embodiment of the present disclosure, which is used to exemplarily illustrate an electronic device configured to implement the method for obtaining the information of the stack frame in the call stack according to the embodiments of the present disclosure. The electronic device according to the embodiments of the present disclosure may include, but is not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, a smart home device, a wearable electronic device, a server, etc. The electronic device illustrated in FIG. 5 is exemplary only, and should not be construed as limiting the function and scope of use of the embodiments of the present disclosure.

As illustrated in FIG. 5, an electronic device 500 includes one or more processors 501 and one or more memories 502. The processor 501 may be a central processing unit (CPU) or a processing unit in other forms having data processing capability and/or instruction execution capability, and may control other components in the electronic device 500 to perform a desired function.

The memory 502 may include one or more computer program products. The computer program product may include various forms of computer readable storage media, such as a volatile memory and/or non-volatile memory. The volatile memory may include, for example, a random-access memory (RAM) and/or a cache memory (cache), etc. The non-volatile memory may include, for example, a read-only memory (ROM), hard disk, a flash memory, etc. One or more computer program instructions may be stored on a computer readable storage medium, the processor 501 may execute the program instructions to implement the method for obtaining the information of the stack frame in the call stack according to embodiments of the present disclosure, and the processor 501 may further implement other desired functions. Various contents such as an input signal, a signal component, a noise component, etc. may be stored into the computer readable storage medium.

According to the embodiments of the present disclosure, the method for obtaining information of the stack frame in the call stack includes: obtaining to-be-processed call stack with an abnormality during running of a program, wherein each area element of the to-be-processed call stack includes a method pointer and an instruction offset value corresponding to the method pointer, and a total number of area elements of the to-be-processed call stack is N; applying for a first memory area, wherein a first half of area elements of the first memory area are used to store the method pointer, a second half of the area elements of the first memory area are used to store the instruction offset value corresponding to the method pointer, and a total number of the area elements of the first memory area is 2N; obtaining an address of the first memory area; applying for a second memory area, and storing the address of the first memory area into a first area element in the second memory area, wherein a total number of area elements of the second memory area is N+1; obtaining an address of the second memory area; applying for a third memory area, obtaining a target storage area in the third memory area, and storing the address of the second memory area into the target storage area; and obtaining information of each stack frame in the to-be-processed call stack by executing a code segment corresponding to a stack frame information obtaining functional module getStackTrace based on the address of the second memory area stored in the target storage area. It should be understood that the electronic device 500 may further perform other optional schemes according to the method embodiments of the present disclosure.

In one example, the electronic device 500 may further include an input unit 503 and an output unit 504. These components are interconnected via a bus system and/or other forms of connection mechanisms (not shown).

In addition, the input unit 503 may include, for example, a keyboard, a mouse, etc.

The output unit 504 may output various information to an outside, including determined distance information, directional information, etc. The output unit 504 may include, for example, a monitor, a speaker, a printer, and a communication network and a remote output device to which the communication network is connected, etc.

Of course, for simplicity, only some of the components of the electronic device 500 relevant to the present disclosure are illustrated in FIG. 5, and components such as the bus, input/output interfaces, etc. are omitted. In addition, the electronic device 500 may further include any other appropriate components depending on the specific application.

In addition to the method and apparatus described above, the embodiments of the present disclosure further provide a computer program product. The computer program product includes a computer program or computer program instructions. The computer program or computer program instructions, when executed by a computing device, cause the computing device to implement any method for obtaining the information of the stack frame in the call stack according to the embodiments of the present disclosure.

The computer program product may include program codes for implementing the operations according to the embodiments of the present disclosure written in any combination of one or more programming languages. The programming languages may include object-oriented programming languages, such as Java, Smalltalk, C++, as well as conventional procedure-oriented programming languages, such as "C" language or similar programming languages. The program codes may be executed completely on a user electronic device, partly on the user electronic device, as a standalone software package, partly on the user electronic device and partly on a remote electronic device, or completely on the remote electronic device or server.

In addition, the embodiments of the present disclosure may further provide a computer readable storage medium. The computer readable storage medium has computer program instructions stored thereon. The computer program instructions, when executed by a computing device, cause the computing device to implement any method for obtaining the information of the stack frame in the call stack according to the embodiments of the present disclosure.

According to the embodiments of the present disclosure, the method for obtaining information of the stack frame in the call stack includes: obtaining a to-be-processed call stack with an abnormality during running of a program, wherein each area element of the to-be-processed call stack includes a method pointer and an instruction offset value corresponding to the method pointer, and a total number of area elements of the to-be-processed call stack is N; applying for a first memory area, wherein a first half of area elements of the first memory area are used to store the method pointer, and a second half of the area elements of the first memory area are used to store the instruction offset value corresponding to the method pointer, and a total number of the area elements of the first memory area is 2N; obtaining an address of the first memory area; applying for a second memory area, and storing the address of the first memory area into a first area element in the second memory area, wherein a total number of area elements of the second memory area is N+1; obtaining an address of the second memory area; applying for a third memory area, obtaining a target storage area in the third memory area, and storing the address of the second memory area into the target storage area; and obtaining information of each stack frame in the to-be-processed call stack by executing a code segment corresponding to a stack frame information obtaining functional module getStackTrace based on the address of the second memory area stored in the target storage area. It should be understood that the computer program instructions, when executed by the computing device, may further cause the computing device to implement other optional schemes according to the method embodiments of the present disclosure.

The computer-readable storage medium in the present disclosure may be any combination of one or more readable media. The readable media may be readable signal media or readable storage media. The readable storage media may include, but are not limited to, for example, an electrical, magnetic, optical, electromagnetic, infrared, or semiconductor system, apparatus, or device, or any combination thereof. More specific examples (a non-exhaustive list) of the readable storage media may include: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof.

It should be noted that the relational terms herein, such as "first" and "second", are used only for distinguishing one entity or operation from another entity or operation, which, however do not necessarily require or imply that there should be any actual relationship or sequence among these entireties or operations. Moreover, the terms "comprise", "include" or any other variations thereof are intended to cover non-exclusive inclusion, so that the process, method, article or device comprising a series of elements not only comprises those elements, but also comprises other elements that are not explicitly listed or further comprises the inherent elements of the process, method, article or device. In the case that there are no more restrictions, an element defined by the statement "comprises a . . . " does not exclude the presence of additional identical elements in the process, method, article or device that comprises said element.

The above description is merely specific implementations of the present disclosure to enable those skilled in the art to understand or implement the present disclosure. A variety of modifications to these embodiments will be apparent to those skilled in the art, and the general principles defined herein can be implemented in other embodiments without departing from the ideas or scope of the present disclosure. Accordingly, the present disclosure is not limited to these embodiments herein, but will be subject to the widest scope consistent with the principles and novel features disclosed herein.

What is claimed is:

1. A method for obtaining information of a stack frame in a call stack, comprising:

obtaining a to-be-processed call stack with an abnormality during running of a program, each area element of the to-be-processed call stack comprising a method pointer and an instruction offset value corresponding to the method pointer, where a total number of area elements of the to-be-processed call stack is N;

applying for a first memory area, a first half of area elements of the first memory area being used to store the method pointer, and a second half of the area elements of the first memory area being used to store the instruction offset value corresponding to the method pointer, wherein a total number of the area elements of the first memory area is 2N;

obtaining an address of the first memory area;

applying for a second memory area, and storing the address of the first memory area into a first area element in the second memory area, wherein a total number of area elements of the second memory area is N+1;

obtaining an address of the second memory area;
applying for a third memory area, obtaining a target storage area in the third memory area, and storing the address of the second memory area into the target storage area; and
obtaining information of each stack frame in the to-be-processed call stack by executing a code segment corresponding to a stack frame information obtaining functional module getStackTrace based on the address of the second memory area stored in the target storage area.

2. The method according to claim 1, wherein:
said applying for the first memory area comprises: applying for the first memory area for a first array belonging to an integer type or a long integer type, elements of the first array being stored into the area elements of the first memory area, respectively;
said applying for the second memory area comprises: applying for the second memory area for a second array under an object base class Object, elements of the second array being stored into the area elements of the second memory area, respectively; and
said applying for the third memory area comprises: applying for the third memory area for a target object under an abnormal parent class Throwable.

3. The method according to claim 1, wherein the method pointer or the instruction offset value occurs in the to-be-processed call stack in a same sequence as in the first memory area.

4. The method according to claim 1, wherein said obtaining the information of each stack frame in the to-be-processed call stack by executing the code segment corresponding to the stack frame information obtaining functional module getStackTrace based on the address of the second memory area stored in the target storage area comprises:
obtaining a storage address of the information of each stack frame in the to-be-processed call stack by executing the code segment corresponding to the stack frame information obtaining functional module getStackTrace based on the address of the second memory area stored in the target storage area; and
obtaining the information of each stack frame based on the storage address.

5. The method according to claim 1, wherein the information of each stack frame comprises at least one of a method name of the stack frame, a class name where a method of the stack frame is located, a source code file name corresponding to the stack frame, or a source code line number corresponding to the stack frame.

6. The method according to claim 1, further comprising:
transmitting the information of each stack frame to a server, the server being configured to analyze the abnormality during the running of the program based on the information of each stack frame.

7. The method according to claim 1, wherein said obtaining the to-be-processed call stack with the abnormality during the running of the program comprises:
obtaining a plurality of call stacks each with an abnormality during the running of the program;
determining duplicated call stacks from the plurality of call stacks through comparison of the method pointer and the instruction offset value between the plurality of call stacks; and
performing de-duplication on the plurality of call stacks based on the duplicated call stacks, to obtain the to-be-processed call stack.

8. An electronic device, comprising:
a memory having a computer program stored therein; and
a processor, wherein the computer program, when executed by the processor, causes the electronic device to:
obtain a to-be-processed call stack with an abnormality during running of a program, each area element of the to-be-processed call stack comprising a method pointer and an instruction offset value corresponding to the method pointer, where a total number of area elements of the to-be-processed call stack is N;
apply for a first memory area, a first half of area elements of the first memory area being used to store the method pointer, and a second half of the area elements of the first memory area being used to store the instruction offset value corresponding to the method pointer, wherein a total number of the area elements of the first memory area is 2N;
obtain an address of the first memory area;
apply for a second memory area, and store the address of the first memory area into a first area element in the second memory area, wherein a total number of area elements of the second memory area is N+1;
obtain an address of the second memory area;
apply for a third memory area, obtain a target storage area in the third memory area, and store the address of the second memory area into the target storage area; and
obtain information of each stack frame in the to-be-processed call stack by executing a code segment corresponding to a stack frame information obtaining functional module getStackTrace based on the address of the second memory area stored in the target storage area.

9. The electronic device according to claim 8, wherein
said applying for the first memory area comprises: applying for the first memory area for a first array belonging to an integer type or a long integer type, elements of the first array being stored into the area elements of the first memory area, respectively;
said applying for the second memory area comprises: applying for the second memory area for a second array under an object base class Object, elements of the second array being stored into the area elements of the second memory area, respectively; and
said applying for the third memory area comprises: applying for the third memory area for a target object under an abnormal parent class Throwable.

10. The electronic device according to claim 8, wherein the method pointer or the instruction offset value occurs in the to-be-processed call stack in a same sequence as in the first memory area.

11. The electronic device according to claim 8, wherein said obtaining the information of each stack frame in the to-be-processed call stack by executing the code segment corresponding to the stack frame information obtaining functional module getStackTrace based on the address of the second memory area stored in the target storage area comprises:
obtaining a storage address of the information of each stack frame in the to-be-processed call stack by executing the code segment corresponding to the stack frame information obtaining functional module getStackTrace based on the address of the second memory area stored in the target storage area; and
obtaining the information of each stack frame based on the storage address.

12. The electronic device according to claim 8, wherein the information of each stack frame comprises at least one of a method name of the stack frame, a class name where a method of the stack frame is located, a source code file name corresponding to the stack frame, or a source code line number corresponding to the stack frame.

13. The electronic device according to claim 8, wherein the computer program, when executed by the processor, further causes the electronic device to:
transmit the information of each stack frame to a server, the server being configured to analyze the abnormality during the running of the program based on the information of each stack frame.

14. The electronic device according to claim 8, wherein said obtaining the to-be-processed call stack with the abnormality during the running of the program comprises:
obtaining a plurality of call stacks each with an abnormality during the running of the program;
determining duplicated call stacks from the plurality of call stacks through comparison of the method pointer and the instruction offset value between the plurality of call stacks; and
performing de-duplication on the plurality of call stacks based on the duplicated call stacks, to obtain the to-be-processed call stack.

15. A non-transitory computer-readable storage medium, having a computer program stored therein, wherein the computer program, when executed by a computing device, causes the computing device to:
obtain a to-be-processed call stack with an abnormality during running of a program, each area element of the to-be-processed call stack comprising a method pointer and an instruction offset value corresponding to the method pointer, where a total number of area elements of the to-be-processed call stack is N;
apply for a first memory area, a first half of area elements of the first memory area being used to store the method pointer, and a second half of the area elements of the first memory area being used to store the instruction offset value corresponding to the method pointer, wherein a total number of the area elements of the first memory area is 2N;
obtain an address of the first memory area;
apply for a second memory area, and store the address of the first memory area into a first area element in the second memory area, wherein a total number of area elements of the second memory area is N+1;
obtain an address of the second memory area;
apply for a third memory area, obtain a target storage area in the third memory area, and store the address of the second memory area into the target storage area; and
obtain information of each stack frame in the to-be-processed call stack by executing a code segment corresponding to a stack frame information obtaining functional module getStackTrace based on the address of the second memory area stored in the target storage area.

16. The non-transitory computer-readable storage medium according to claim 10, wherein
said applying for the first memory area comprises: applying for the first memory area for a first array belonging to an integer type or a long integer type, elements of the first array being stored into the area elements of the first memory area, respectively;
said applying for the second memory area comprises: applying for the second memory area for a second array under an object base class Object, elements of the second array being stored into the area elements of the second memory area, respectively; and
said applying for the third memory area comprises: applying for the third memory area for a target object under an abnormal parent class Throwable.

17. The non-transitory computer-readable storage medium according to claim 15, wherein the method pointer or the instruction offset value occurs in the to-be-processed call stack in a same sequence as in the first memory area.

18. The non-transitory computer-readable storage medium according to claim 15, wherein said obtaining the information of each stack frame in the to-be-processed call stack by executing the code segment corresponding to the stack frame information obtaining functional module getStackTrace based on the address of the second memory area stored in the target storage area comprises:
obtaining a storage address of the information of each stack frame in the to-be-processed call stack by executing the code segment corresponding to the stack frame information obtaining functional module getStackTrace based on the address of the second memory area stored in the target storage area; and
obtaining the information of each stack frame based on the storage address.

19. The non-transitory computer-readable storage medium according to claim 15, wherein the information of each stack frame comprises at least one of a method name of the stack frame, a class name where a method of the stack frame is located, a source code file name corresponding to the stack frame, or a source code line number corresponding to the stack frame.

20. The non-transitory computer-readable storage medium according to claim 15, wherein the computer program, when executed by the computing device, further causes the computing device to:
transmit the information of each stack frame to a server, the server being configured to analyze the abnormality during the running of the program based on the information of each stack frame.

* * * * *